United States Patent
Fahldieck

(10) Patent No.: US 8,701,872 B2
(45) Date of Patent: Apr. 22, 2014

(54) CLIP FOR CAPTURING BOTTLE NECKS, PARTICULARLY OF PET BOTTLES

(75) Inventor: Andreas Fahldieck, Idar-Oberstein (DE)

(73) Assignee: KHS GmbH, Dortmund (DE)

( * ) Notice: Subject to any disclaimer, the term of this patent is extended or adjusted under 35 U.S.C. 154(b) by 301 days.

(21) Appl. No.: 13/121,312

(22) PCT Filed: Mar. 26, 2009

(86) PCT No.: PCT/EP2009/002208
§ 371 (c)(1),
(2), (4) Date: Mar. 28, 2011

(87) PCT Pub. No.: WO2010/060487
PCT Pub. Date: Jun. 3, 2010

(65) Prior Publication Data
US 2011/0180374 A1    Jul. 28, 2011

(30) Foreign Application Priority Data
Nov. 3, 2008  (DE) .................. 10 2008 055 617

(51) Int. Cl.
*B67C 3/24* (2006.01)
(52) U.S. Cl.
USPC ..................... 198/803.7; 198/803.6
(58) Field of Classification Search
USPC .......... 198/470.1, 472.1, 474.1, 475.1, 803.3, 198/803.4, 803.6, 867.04, 867.05, 803.7; 294/90, 99.1, 106, 110.1, 198, 65.5
See application file for complete search history.

(56) References Cited

U.S. PATENT DOCUMENTS

| | | | |
|---|---|---|---|
| 4,943,099 A * | 7/1990 | Gabriel | 294/82.32 |
| 4,968,081 A * | 11/1990 | Beight et al. | 294/104 |
| 4,995,501 A * | 2/1991 | Lundstrom et al. | 198/341.05 |
| 6,386,609 B1 | 5/2002 | Govzman | |
| 6,626,476 B1 * | 9/2003 | Govzman et al. | 294/119.1 |
| 6,758,907 B2 * | 7/2004 | Kampmann | 118/503 |
| 7,784,603 B2 | 8/2010 | Burgmeier | |
| 8,128,142 B2 * | 3/2012 | Glotzl | 294/116 |
| 8,297,671 B2 * | 10/2012 | Knieling et al. | 294/90 |
| 8,342,314 B2 * | 1/2013 | Michel | 198/468.5 |
| 8,360,492 B2 * | 1/2013 | Winzinger et al. | 294/106 |
| 2008/0272609 A1 | 11/2008 | Knieling et al. | |

FOREIGN PATENT DOCUMENTS

| | | |
|---|---|---|
| DE | 60009223 | 3/2005 |
| DE | 202006004641 | 3/2005 |
| DE | 202005002924 | 3/2006 |
| DE | 102005014838 | 10/2006 |
| DE | 102005041929 | 3/2007 |
| DE | 102006012020 | 9/2007 |
| EP | 1088604 | 4/2001 |
| EP | 1375395 | 1/2004 |
| EP | 1868746 | 12/2007 |
| EP | 1999048 | 12/2008 |
| JP | 02190229 | 7/1990 |

* cited by examiner

*Primary Examiner* — Douglas Hess
(74) *Attorney, Agent, or Firm* — Occhiuti & Rohlicek LLP

(57) ABSTRACT

An apparatus for gripping bottle necks includes a clip having first and second opposed clip arms, each of which can be swivelled in a horizontal plane about a corresponding swivelling axis. Each clip arm has a corresponding grip area, a first magnet attached to the first clip arm between a grip area thereof and the swivelling axis about which the first clip arm swivels, and another permanent a second magnet attached to the second clip arm between a grip area thereof and the swivelling axis about which the second clip arm swivels. The first and second magnets exert a closing force on the clip in an operating position thereof.

20 Claims, 6 Drawing Sheets

Figure 3:
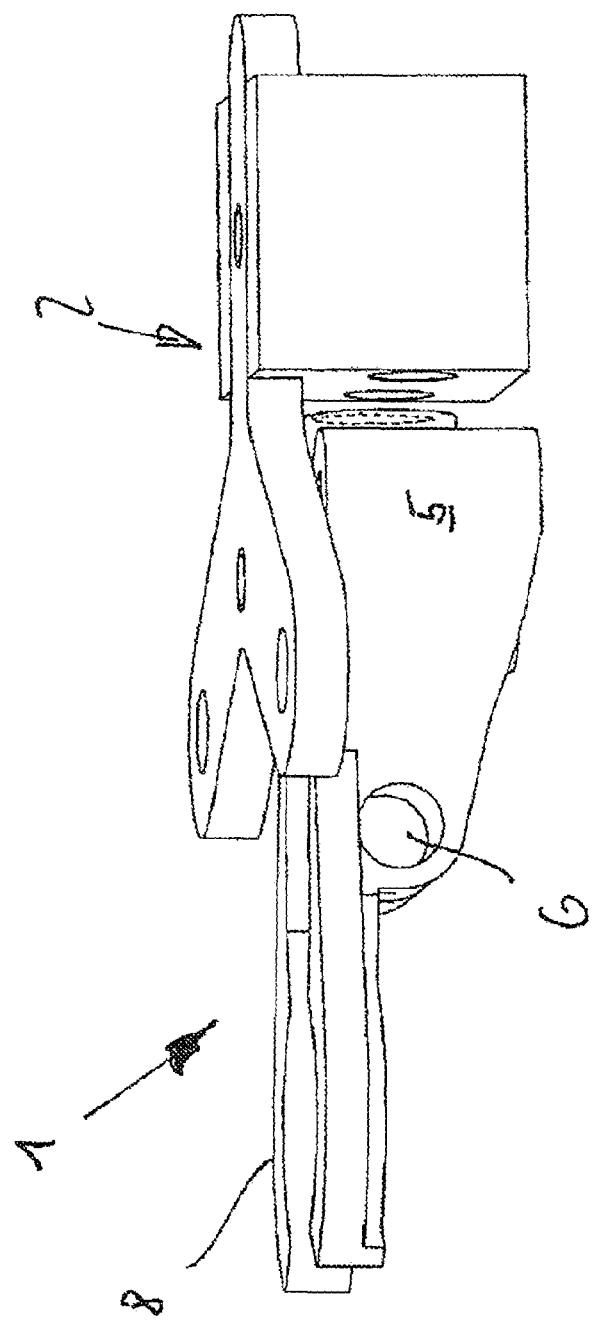

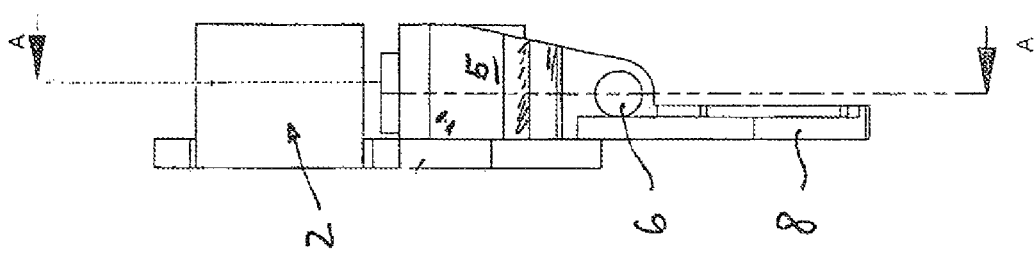
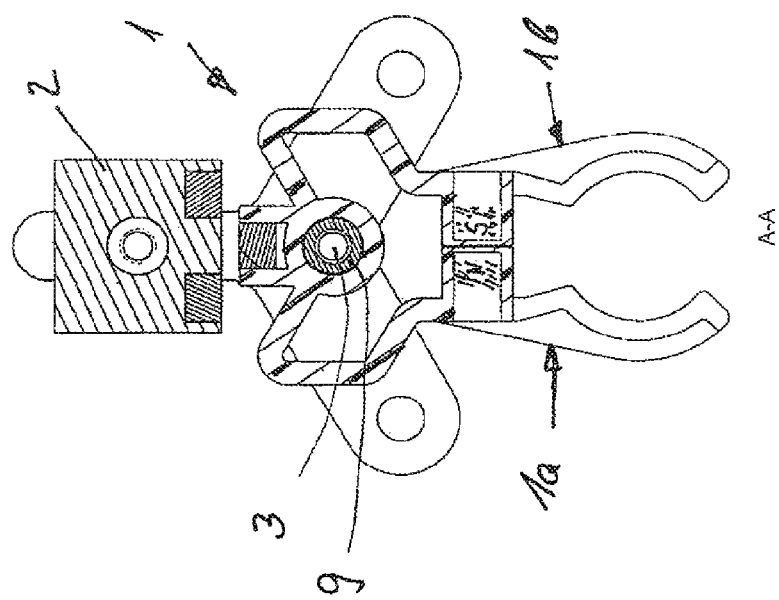

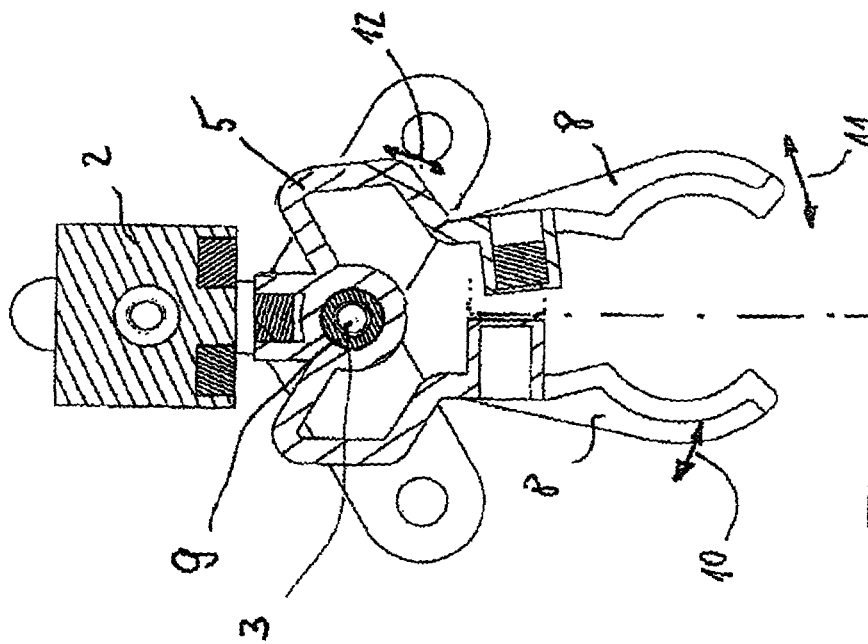
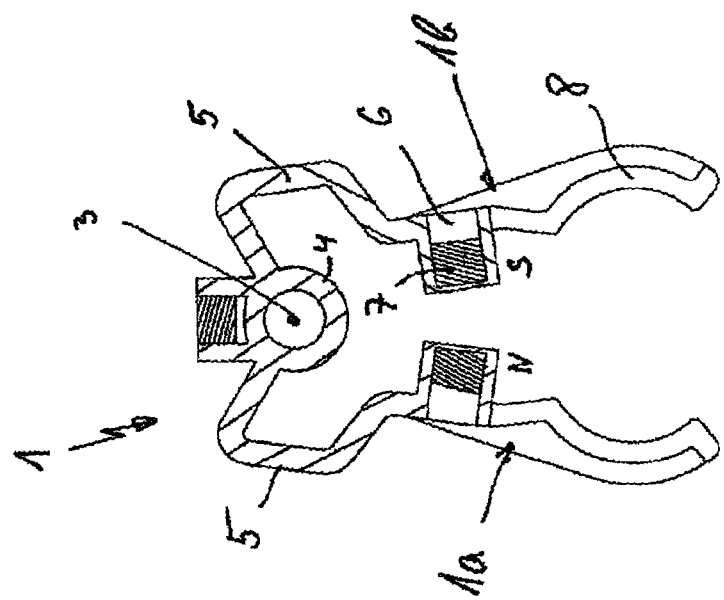
Fig. 5
Fig. 4

CLIP FOR CAPTURING BOTTLE NECKS, PARTICULARLY OF PET BOTTLES

CROSS-REFERENCE TO RELATED APPLICATIONS

This application is the National Stage of International Application No. PCT/EP2009/002208, filed on Mar. 26, 2009, which claims the priority of German Patent Application No. 10 2008 055 617.3, filed on Nov. 3, 2008. The contents of both applications are hereby incorporated by reference in their entirety.

The invention is aimed at a clip for gripping bottle necks, especially those of PET bottles in bottling plants, whereby the clip arms can be swivelled in the horizontal plane.

Such clips are available in very differing designs. For instance, DE 10 2006 012 020 A shows a clip pair of which the clip arms can be swivelled in unseparated axes and the closing force is held in the closed position with the aid of a spring. Because this type of spring element often does not comply with the hygienic requirements of bottling plants, it is the aim to propose different closing mechanisms. Therefore DE 10 2005 041 929 makes provision for a complex design with permanent magnets, which support both closing and opening in different pair configurations. In this solution the permanent magnets are positioned outside of the clip gripper arms.

A solution according to DE 20 2005 002 924 U or DE 10 2005 014 838 A makes provision for opposing magnets between the gripping range of the clips and the swivelling axes, to support the opening force of the clips.

It is the task of the invention on hand to achieve the most consistent holding forces for bottle necks of differing diameters by means of a simple construction.

According to the invention, this task is solved with a clip of the type described above through both clip arms being manufactured of plastic, featuring receptacles for permanent magnets between the gripping range of the clips and the swivelling axes, which exert a closing force on the clip in the operational position. In this way it is achieved that the permanent magnets by themselves provide the necessary closing force for small bottle neck diameters, for instance.

Depending on the positioning of the permanent magnets in the clip arms, this closing force is sufficient for a wide spectrum of bottle neck diameters, however, this holding force may not be sufficient for larger bottle necks.

In this case the invention makes provision for the clip arms to be furnished with a clip bracket between the permanent magnets and the swivelling axis, which allows elastic opening and spring return.

The permanent magnets are conveniently bedded into the plastic, specifically moulded into the plastic, as is provided for by the invention. With this design it is achieved that the clip can be manufactured of an easy to clean plastic material, which complies with the requirements regarding cleanability of these elements including the clip according to the invention as a universal clip.

According to the invention, further design makes provision for the gripping area of the clip, the permanent magnet receptacles, the gripper arms with the clip bracket and the swivelling axis bearing of the clip being designed as a single plastic element.

The single element feature of the entire clip presents a very simple and functional clip, which is easy to manufacture and also particularly easy to replace in case of damage to the clip.

Another design of the invention makes provision for the permanent magnets in the clip arms being fixed in a replaceable frame. This interchangeability can be expedient, for instance when stronger magnets need to be fitted or when damaged magnets need to be replaced.

According to a further design example, the invention can also make provision for the clip arms to be arranged so that they can be swivelled individually, furnished with a receptacle with permanent magnets in the swivel axis area, whereby provision has been made for mutually repelling permanent magnets in the clip holding block.

The invention is explained in more detail below, with the aid of the drawing. It shows in FIG. 1 a clip with attachment, top view, partial sectional view along line A-A, FIG. 2 a side elevation of the clip, FIG. 3 a spatial side elevation of the clip according to FIGS. 1 and 2, FIG. 4 the clip invention without further modules, in opened position for large bottle neck diameters, FIG. 5 a presentation of the clip, essentially corresponding to FIG. 1 with a partially opened clip arm, as well as in FIG. 6 a modified design example of the clip.

Figure 7:
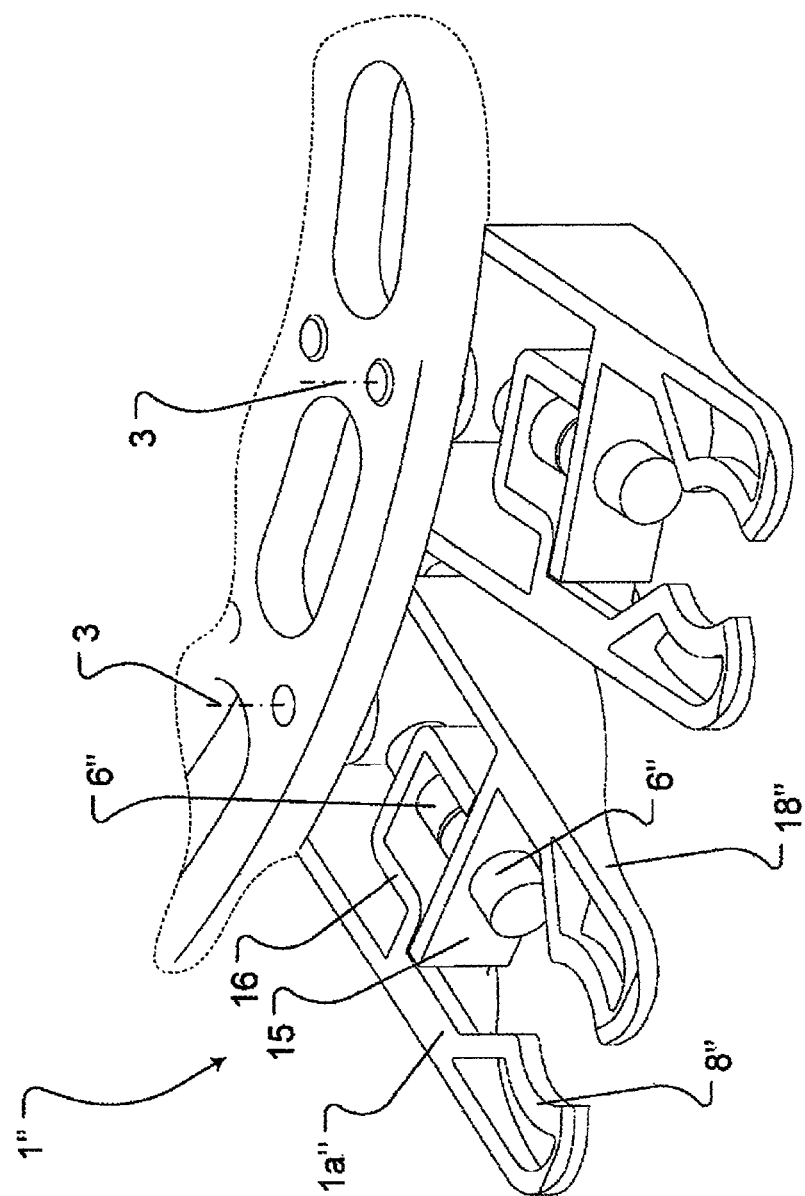
Figure 8:
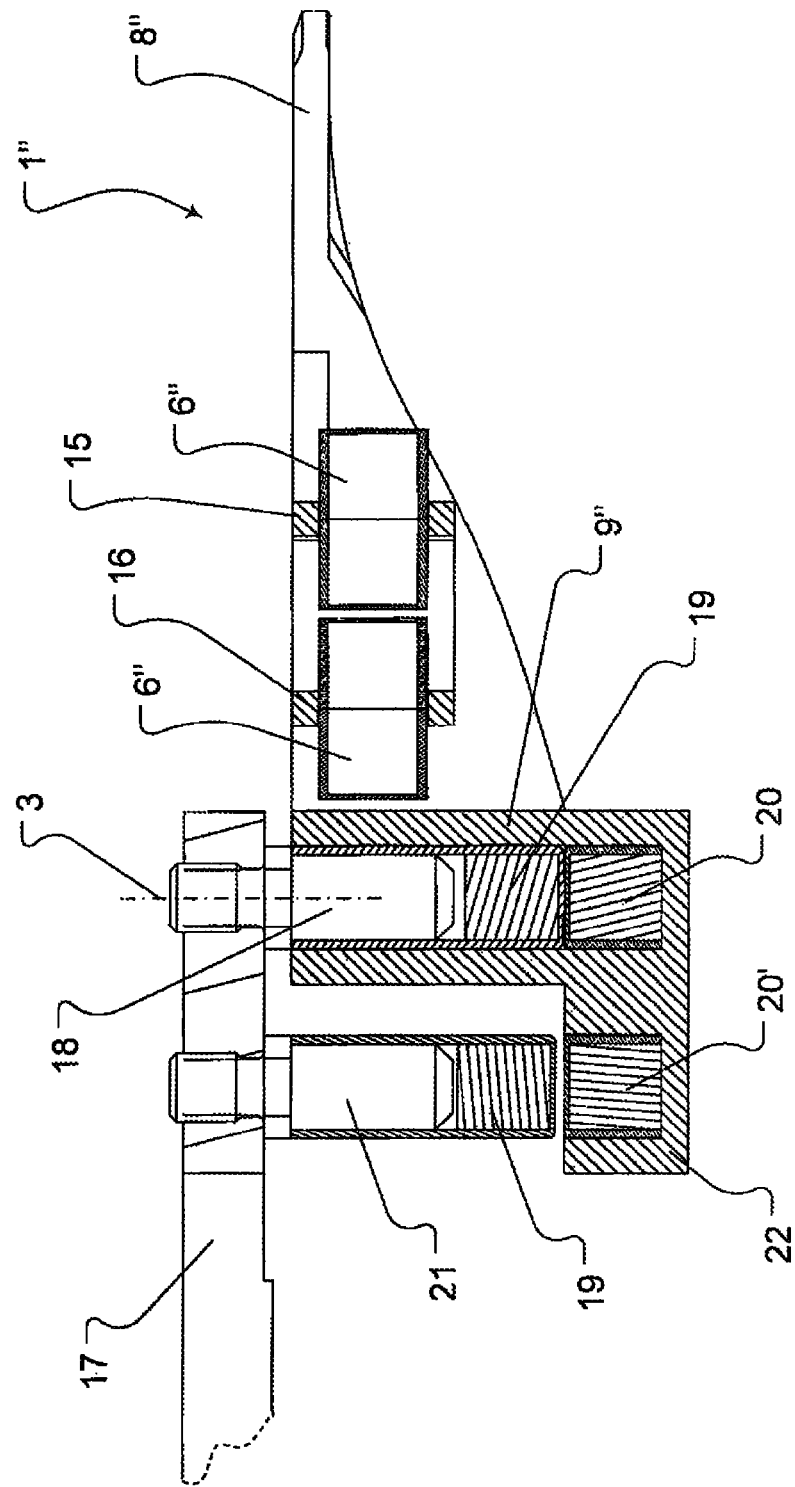

FIG. 7 an enlarged spatial presentation of a modified design example of the clip invention as well as in FIG. 8 a partial section along line VIII-VIII in FIG. 7.

The clip, generally designated with 1, on a clip holding block 2, which can rotate around an axis 3 allowing slight swivelling, manufactured as a single piece of plastic material. As shown in FIG. 4 as an example, the structure of the clip is as follows:

The clip 1 features two clip arms 1a and 1b. From a ring-shaped bushing forming an axis around swivelling axis 3, designated with 4 in FIG. 4, two diamond-shaped clip bracket areas 5 extend as mirror images symmetrically, extending into receptacles 6 into which permanent magnets 7 are moulded, arranged as opposing poles, so that the closing force of the clip is achieved. The gripping areas or gripper brackets of clip 1, designated with 8, are attached to these receptacles 6 for the permanent magnets.

In FIGS. 1 and 5 it is indicated that clip 1 is positioned with a sliding bushing 9 to clip holding block 2, allowing slight swivelling. This sliding bushing 9 allows it to be easily attached or removed.

In FIG. 5 it is shown that the clip brackets 8 can be opened or closed slightly when bottle necks of small diameter are being gripped, whereby the closing force is provided by the permanent magnets 7. This smaller opening range is indicated by the double arrow 10.

When bottles with larger diameters are gripped, die clip arms can be opened wider with the clip brackets 8, as indicated by double arrow 11 in the right hand part of FIG. 5. The reset force is achieved by means of the deformability of the clip brackets 5. This is indicated by a small double arrow in the right hand part of FIG. 5.

Figure 6:
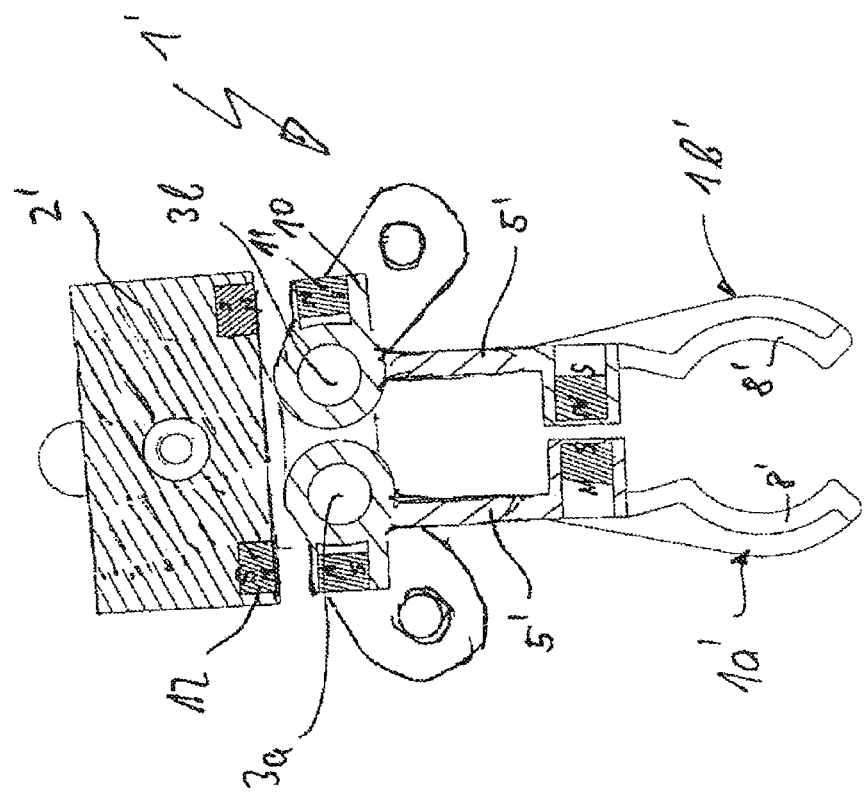

FIG. 6 shows a modified design example of the invention, whereby the functionally equivalent parts of the design form in the previous figures are designated with the same reference character, supplemented by a "'".

Contrary to the previous design forms, the two clip arms 1a' and 1b' can be swivelled around rotational axes 3a and 3b. These swivel areas have receptacles 10 into which permanent magnets 11 have been embedded, which correspond to the permanent magnets 12, which are embedded into the clip holding block designated with 2' in such a way that the polarity is repelling to that of the permanent magnets 11. This results in an additional closing force being exerted on the grip areas 8'.

FIGS. 7 and 8 show another modified design example, whereby here too the functionally equivalent parts of the design form in the previous figures are designated with the same reference character as for the description of the preceding design forms, in part supplemented by a "'''".

An essential difference between the design according to FIGS. 7 and 8 lies in the clip arms 1*a*" or 1*b*", generally designated with 1", being furnished with inward pointing support arms 15 or 16, which carry the permanent magnets 6", which serve the purpose of centring or resetting the clip arms. In the example shown in FIG. 7, support arm 15 is designed as an inwardly pointing bar, while support arm 16 is offset as a dual L-shape and the application point of the resetting force in the relevant clip arm 1*a* and 1*b* must be applied more or less exactly at the geometrically identical position as for the relevant other arm.

Contrary to the design options shown in FIG. *H3, this allows a different arrangement of the permanent magnets 6". Instead of magnets being arranged in the direction of rotation, these are arranged radially, i.e. normal to the direction of rotation. This has the advantage that the mutual influence of clips arranged next to each other due to the magnetically repelling effect of the same magnetic orientation (south-south, north-north) of the relevant neighbouring clips, supports a quick and effective centring of the clips.

FIG. 8 shows in a section how the relevant clips 1" are attached to a machine element, e.g. a star, generally designated with 17. Each of the clips 1" can be identified by being furnished with a sliding bushing 9" on its ends facing away from the grip areas 8", furnished to overlap with a fulcrum pin 18 inserted from the top into the sliding bushing, which is furnished with a magnetisable or magnetised area at its lower end, generally designated with 19, while the sliding bushing is furnished with a blind hole, which in turn is furnished with a magnetisable or magnetised element 20 at the bottom of the hole in such a way that these two areas between the bushing and the fulcrum pin attract each other so that clip 1" is fixed at that height.

A second pin 21, also furnished with a magnetisable or magnetised end 19, has been provided on the star 17 for centring and resetting clip 1", whereby a receptacle 22 is formed on the sliding bushing 9", which again has a magnetisable or magnetised end 20, whereby these two areas attract each other in the assembled position in such a way that clip 1" is again reset into its required position.

Another design option is to fix clip 1" regarding rotation around rotational axis 3 sideways, by inserting a longer unmagnetised pin directly into receptacle 22, instead of the magnetised pin 21. For this design magnet 20 in receptacle 22 is omitted, so that the longer unmagnetised pin will install in receptacle 22 with positive locking.

In addition a third option is suggested, whereby clip 1" is drilled through instead of the two blind holes, whereby form-fit attachment and fixing at the height is possible by means of screws or spring clips, etc.

This mechanically more sound fixing at the height allows the holding of filled bottles, which is of importance for the use of the previously mentioned clips of a bottle filling plant.

Of course the described design example of the invention can still be changed in many ways without abandoning the underlying line of thought. The invention is specifically neither limited to the geometric design of the clip brackets of the relevant clip, nor to the presented pot-shaped receptacle of the permanent magnets and the like.

Of course the described design example of the invention can still be changed in many ways without abandoning the underlying line of thought. The invention is specifically neither limited to the geometric design of the clip brackets of the relevant clip, nor to the presented pot-shaped receptacle of the permanent magnets and the like.

The invention claimed is:

1. An apparatus for gripping bottle necks, said apparatus comprising: a clip having first and second opposed clip arms, each of which can be swiveled in a horizontal plane about a corresponding swiveling axis, each clip arm having a corresponding grip area, a first magnet attached to the first clip arm between a grip area thereof and the swiveling axis about which the first clip arm swivels, and a second magnet attached to the second clip arm between a grip area thereof and the swiveling axis about which the second clip arm swivels, wherein the first and second magnets exert a closing force on the clip in an operating position thereof.

2. The apparatus of claim 1, wherein both clip arms are manufactured from plastic, and wherein each clip arm comprises a magnet receptacle for receiving a magnet, each magnet receptacle being disposed between a gripper area and a corresponding swiveling axis.

3. The apparatus of claim 2, wherein each clip arm comprises a clip bracket between the magnet receptacle and the swiveling axis for allowing elastic opening and resetting.

4. The apparatus of claim 2, wherein the grip areas, the magnet receptacles, the clip arms with clip brackets, and a swiveling axis bearing of the clip comprise a single plastic element.

5. The apparatus of claim 2, wherein the clip arms are mounted to swivel separately, and wherein the clip arms are furnished with magnets configured to exert a repelling magnetic force against corresponding magnets at a clip holding block.

6. The apparatus of claim 1, wherein the permanent magnets are embedded into the clip arms.

7. The apparatus of claim 1, further comprising a replaceable frame for attaching the magnets to the clip arms.

8. The apparatus of claim 1, wherein the magnets are attached to the clip arms in a replaceable frame.

9. An apparatus for transporting containers, said apparatus comprising a linearly driven transport device having a plurality of clips on a periphery thereof, each of said clips being configured as recited in claim 1.

10. A method for transporting containers, said method comprising: causing a plurality of clips to engage a corresponding plurality of containers, each of said clips having the limitations of claim 1, said clips being mounted on a linearly or rotationally driven transport device.

11. The apparatus of claim 1, wherein the first and second magnets are positioned tangentially or radially relative to a swing circle of the clip arms.

12. The apparatus of claim 1, further comprising supporting arms that carry the magnets pointing inwards from the clip arms.

13. The apparatus of claim 1, wherein the clip further comprises: a sliding bushing furnished to overlap with a fulcrum pin on a star, the sliding bushing being adapted for insertion of the fulcrum pin therein; the sliding bushing having a magnetizable or magnetized area at a free end thereof, whereby a permanent magnet, working in conjunction with the fulcrum pin, is positioned in a lower area of the sliding bushing.

14. The apparatus of claim 13, wherein the sliding bushing further comprises a horizontal receptacle with a permanent magnet pointing away from the clip arms, whereby at a star, provision is made for a second pin parallel to a swiveling pin having a free end, said free end having an area that can be influenced magnetically for centering or resetting the clip.

15. The apparatus of claim 14, wherein the clip is fixed sideways relative to rotation around a swiveling axis, and wherein a lower end of the pin extends into a receptacle.

16. The apparatus of claim 1, wherein the clip arms rotate separately, and each clip arm comprises a sliding bushing with a permanent magnet, and a horizontal receptacle with a permanent magnet.

17. The apparatus of claim 16, wherein the sliding bushings are drilled through, and each bushing receives a free lower end of a pin that protrudes through a receptacle to provide fixing options for a locking element.

18. An apparatus for transporting containers, said apparatus comprising a rotationally driven transport device having a plurality of clips on a periphery thereof, said clips configured as recited in claim 1.

19. The apparatus of claim 18, wherein the permanent magnets of all clips are aligned to the north-south alignment with reference to the main rotational axis or direction of movement of the transport device.

20. A method for transporting containers, said method comprising: causing a plurality of clips to engage a corresponding plurality of containers, each of said clips having the limitations of claim 1, said clips being mounted on an apparatus for transporting containers, said apparatus comprising a rotationally driven transport device having said plurality of clips on a periphery thereon.

\* \* \* \* \*